(12) United States Patent
Jung et al.

(10) Patent No.: US 9,113,381 B2
(45) Date of Patent: Aug. 18, 2015

(54) APPARATUS AND METHOD FOR PERFORMING HANDOVER IN MULTIPLE COMPONENT CARRIER SYSTEM

(75) Inventors: Myung Cheul Jung, Seoul (KR); Ki Bum Kwon, Seoul (KR)

(73) Assignee: Pantech Co., Ltd., Seoul (KR)

( * ) Notice: Subject to any disclaimer, the term of this patent is extended or adjusted under 35 U.S.C. 154(b) by 283 days.

(21) Appl. No.: 13/805,318

(22) PCT Filed: Jul. 12, 2011

(86) PCT No.: PCT/KR2011/005112
§ 371 (c)(1),
(2), (4) Date: Dec. 18, 2012

(87) PCT Pub. No.: WO2012/011694
PCT Pub. Date: Jan. 26, 2012

(65) Prior Publication Data
US 2014/0192771 A1  Jul. 10, 2014

(30) Foreign Application Priority Data
Jul. 22, 2010  (KR) .......... 10-2010-0071117

(51) Int. Cl.
*H04W 36/08* (2009.01)
*H04W 36/00* (2009.01)

(52) U.S. Cl.
CPC .......... *H04W 36/08* (2013.01); *H04W 36/0083* (2013.01); *H04W 36/0055* (2013.01)

(58) Field of Classification Search
CPC ..... H04W 12/04; H04W 12/06; H04W 12/08; H04W 36/14

USPC ................... 370/328, 329, 330, 331; 455/411
See application file for complete search history.

(56) References Cited

U.S. PATENT DOCUMENTS 8,131,295 B2 * 3/2012 Wang et al. .................... 455/436
8,380,200 B1 * 2/2013 Spitzer et al. ................. 455/436

FOREIGN PATENT DOCUMENTS

| KR | 10-2008-0080803 | 9/2008 |
| KR | 10-2008-0087370 | 10/2008 |
| WO | 2010-024591 | 3/2010 |

OTHER PUBLICATIONS

International Search Report issued for related International Application No. PCT/KR2011/005112 dated Feb. 24, 2012.

* cited by examiner

*Primary Examiner* — Jamal Javaid
(74) *Attorney, Agent, or Firm* — H.C. Park & Associates, PLC

(57) ABSTRACT

An apparatus and method for performing handover in a multiple component carrier system. In an aspect, a method of a target Base Station (BS) performing handover in a multiple component carrier system includes receiving service state information, including information about at least one candidate cell, from a source BS through a handover request message, calculating a final determination value for determining a final cell for a User Equipment (UE) which is a subject of the handover based on the service state information, selecting the final cell by comparing the final determination value and the information about the candidate cell, and sending a handover request Acknowledgement (ACK) message, including information about the selected final cell, to the source BS.

14 Claims, 13 Drawing Sheets

APPARATUS AND METHOD FOR PERFORMING HANDOVER IN MULTIPLE COMPONENT CARRIER SYSTEM

CROSS-REFERENCE TO RELATED APPLICATIONS

This application is the National Stage Entry of International Application PCT/KR2011/005112, filed on Jul. 12, 2011, and claims priority from and the benefit of Korean Patent Application No. 10-2010-0071117, filed on Jul. 22, 2010, all of which are incorporated herein by reference for all purposes as if fully set forth herein.

BACKGROUND

1. Field

The present invention relates to wireless communication, and more particularly, to an apparatus and method for performing handover in a multiple component carrier system.

2. Discussion of the Background

Cellular is a concept proposed to overcome limits to a service area and limits to capacities to accommodate the frequency and subscribers. That is, a mobile communication service area is classified into several small cells, different frequencies are allocated to neighbor cells, and the same frequency band is used in two cells without interference sufficiently spaced apart from each other so that the frequency can be spatially reused.

The term 'handover' or 'handoff' refers to a function of, when a User Equipment (UE) goes out of a current communication service area (hereinafter referred to as a 'serving cell') and moves to a neighbor communication service area (hereinafter referred to as a 'neighbor cell'), the UE is automatically tuned to a new traffic channel of the neighbor communication service area so that the traffic state remains intact. When handover is performed, a call disconnection problem occurring when a UE moves to a neighbor cell can be solved.

In general, a wireless communication system uses one bandwidth for data transmission. In order to increase a transmission capacity, to increase the bandwidth may be said to be indispensable, but to support a great bandwidth even when a required service level is low may result in great power consumption.

In order to solve the problem, a multiple component carrier system for defining a carrier having one bandwidth and the center frequency and sending or receiving or both data through a plurality of carriers in a broadband way is emerging. When one or more carriers are used, a narrowband and a broadband can be supported at the same time.

In the prior art, however, a BS has only to perform handover by taking a single cell, measured and reported by a UE, into account because only handover in a BS using a single component carrier is taken into consideration.

If handover is performed in a multiple component carrier system, multiple component carriers have to be taken into consideration. A target BS needs to perform a handover procedure such that a UE can use component carriers necessary to maintain Quality of Service (QoS) of a level provided by a source BS. However, there is a problem in that it is difficult for the target BS to configure adequate component carriers or component carriers of an adequate level because the target BS is unable to accurately know a service providing situation for the UE prior to the handover procedure. In order to solve the problem, there is provided a handover scheme in which multiple component carriers are taken into consideration.

SUMMARY

It is an object of the present invention to provide an apparatus and method for performing handover in a multiple component carrier system.

It is another object of the present invention to provide an apparatus and method for selecting a primary serving cell and a secondary serving cell when handover is performed in a multiple component carrier system.

It is yet another object of the present invention to provide a handover apparatus and method for selecting a cell guaranteeing QoS of a UE in a multiple component carrier system.

It is further yet another object of the present invention to provide an apparatus and method in which a source BS sends service state information about a UE to a target BS in a multiple component carrier system.

It is further yet another object of the present invention to provide an apparatus and method in which a target BS selects a final cell by taking service state information about a UE into account in a multiple component carrier system.

According to an aspect of the present invention, there is provided a method of performing handover in a multiple component carrier system. A target Base Station (BS) receives service state information, including information about at least one candidate cell, from a source BS through a handover request message, calculates a final determination value for determining a final cell for a User Equipment (UE) which is a subject of the handover based on the service state information, selects the final cell by comparing the final determination value and the information about the candidate cell, and sends a handover request ACK message, including information about the selected final cell, to the source BS.

According to another aspect of the present invention, there is provided a multiple component carrier system performing handover. The multiple component carrier system includes a source BS, a UE, and a target BS. The source BS sends service state information, including information about at least one candidate cell, to the target BS through a handover request message and receives a handover request ACK message, including information about at least one final cell selected by the target BS with consideration taken of QoS of the UE, as a response message to the handover request message. The target BS calculates a final determination value for determining the final cell for the UE based on the service state information received from the source BS, selects the final cell by comparing the calculated final determination value and the information about the at least one candidate cell, and sends the handover request ACK message, including the information about the selected final cell, to the source BS.

According to the present invention, a UE can adequately select component carriers or a cell to be used after handover. Accordingly, there are advantages in that system efficiency can be improved because component carriers need not to be unnecessarily configured or component carriers unable to be used by a UE need not to be unnecessarily selected.

Furthermore, according to the present invention, in a system supporting a plurality of component carriers, handover to a selected cell which maintains the QoS of a UE to the highest degree is performed. Accordingly, there is an advantage in that a problem, such as call disconnection occurring when handover is performed, can be solved.

Furthermore, according to the present invention, reliability of the QoS of a UE when handover is performed can be guaranteed. In particular, handover to an optimal cell can be performed.

DETAILED DESCRIPTION OF THE ILLUSTRATED EMBODIMENTS

Figure 1:
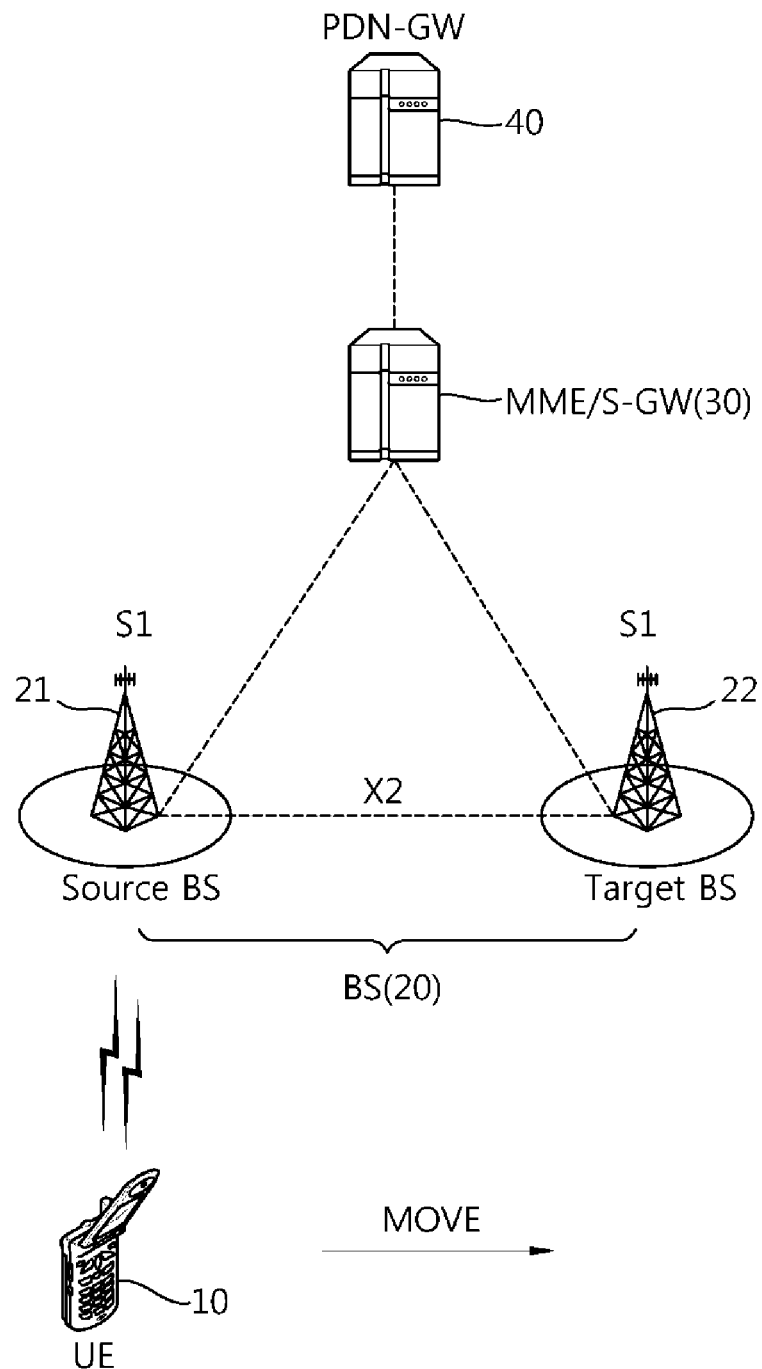
FIG. 1 is a block diagram showing a wireless communication system.

Hereinafter, some embodiments of the present invention will be described in detail with reference to the accompanying drawings. It is to be noted that in assigning reference numerals to respective elements in the drawings, the same reference numerals designate the same elements although the elements are shown in different drawings. Furthermore, in describing the present invention, a detailed description of the known functions and constructions will be omitted if it is deemed to make the gist of the present invention unnecessarily vague.

Furthermore, in this specification, a wireless communication network is the subject of a description. Tasks in the wireless communication network are performed in a process of a system (e.g., a Base Station (BS)), controlling the wireless communication network, controlling the network and sending data, but may be performed in a UE connected to the wireless communication network.

FIG. 1 is a block diagram showing a wireless communication system. The wireless communication system may have a network structure of an E-UMTS (Evolved-Universal Mobile Telecommunications System). The E-UMTS system may also be an LTE (Long Term Evolution) system. The wireless communication system may use a variety of multiple access schemes, such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, and OFDM-CDMA. Here, uplink transmission and downlink transmission may be performed using a TDD (Time Division Duplex) scheme using different times or may be performed using an FDD (Frequency Division Duplex) scheme using different frequencies.

Referring to FIG. 1, An E-UTRAN includes at least one BS 20. The UE 10 may be fixed or mobile an may also be called another terminology, such as an MS (Mobile station), an AMS (Advanced MS), a UT (User Terminal), an SS (Subscriber Station), or a wireless device.

In general, the BS 20 refers to a fixed station communicating with the UE 10, and it may also be called another terminology, such as an eNodeB (evolved NodeB: eNB), a BTS (Base Transceiver System), or an access point. The BS 20 may provide service to at least one cell. The cell is an area in which the BS 20 provides communication service. A source BS 21 refers to a BS having a radio bearer set up with the UE 10. A target BS 22 refers to a BS to which the UE 10 tries to perform handover in order to newly set up a radio bearer with the target BS 22 after releasing the existing radio bearer with the source BS 21. The BSs 20 are interconnected through an X2 interface. The BS 20 is connected to an EPS (Evolved Packet System), more particularly, an MME (Mobility Management Entity)/S-GW (Serving Gateway) 30 through an S1 interface. In order to provide packet data service to the MME/S-GW 30, a PDN-GW 40 is used. The above network structure (i.e., architecture) and the interfaces are based on 3GPP TS23.401 and TS23.402.

Inter E-UTRAN handover is a basic handover mechanism used when handover is performed between E-UTRAN access networks. The inter E-UTRAN handover includes X2-based handover and S1-based handover.

The X2-based handover is used when the UE 10 performs handover from the source BS 21 to the target BS 22 using the X2 interface. Here, the MME/S-GW 30 is not changed.

In the S1-based handover, a first bearer set up among the PDN-GW 40, the MME/S-GW 30, the source BS 21, and the UE 10 is released, and a new second bearer is set up among the PDN-GW 40, the MME/S-GW 30, the target BS 22, and the UE 10.

A carrier aggregation (CA) supports a plurality of carriers. The carrier aggregation is also called a spectrum aggregation or a bandwidth aggregation. Unit carriers aggregated by the carrier aggregation is called a component carrier (hereinafter referred to as a 'CC'). Each CC is defined by the bandwidth and the center frequency. The carrier aggregation increases the throughput and guarantees compatibility with the existing system.

For example, if 5 carriers having a bandwidth of 5 MHz are allocated, a bandwidth of 25 MHz can be supported.

Figure 2:
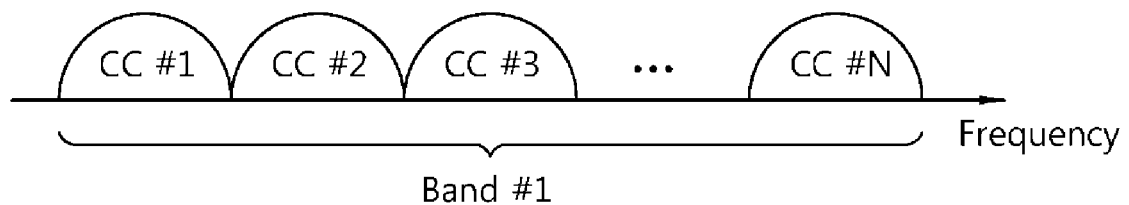
FIG. 2 is an explanatory diagram illustrating the same intra-band contiguous carrier aggregation.
Figure 3:
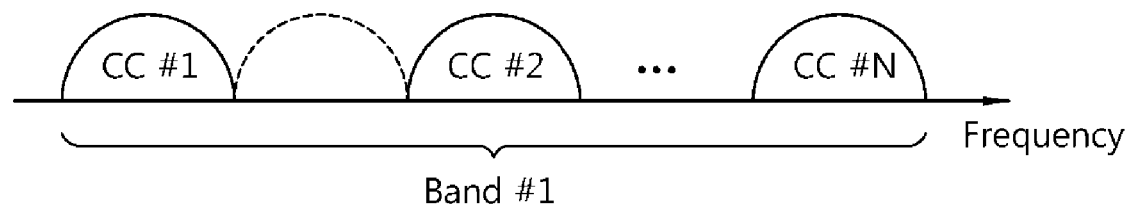
FIG. 3 is an explanatory diagram illustrating the same intra-band non-contiguous carrier aggregation.
Figure 4:
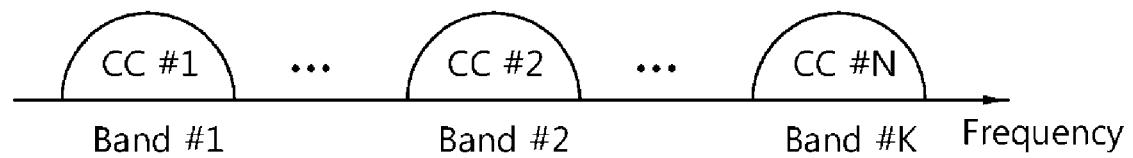
FIG. 4 is an explanatory diagram illustrating the same inter-band carrier aggregation.

The carrier aggregation may be classified into an intra-band contiguous carrier aggregation, such as that shown in FIG. 2, an intra-band non-contiguous carrier aggregation, such as that shown in FIG. 3, and an inter-band carrier aggregation, such as that shown in FIG. 4.

First, referring to FIG. 2, the intra-band contiguous carrier aggregation is performed within intra-band continuous CCs. For example, aggregated CCs, that is, a CC#1, a CC#2, a CC#3 to a CC #N are sequentially contiguous to each other.

Referring to FIG. 3, the intra-band non-contiguous carrier aggregation is performed between discontinuous CCs. For example, aggregated CCs, that is, a CC#1 and a CC#2 are spaced apart from each other at a specific frequency.

Referring to FIG. 4, the inter-band carrier aggregation is of a type in which, when a plurality of CCs exists, one or more of the CCs are aggregated on different frequency bands. For example, an aggregated CC, that is, CC #1 exists in an operating band #1, and an aggregated CC, that is, a CC #2 exists in an operating band #2.

The number of aggregated carriers may be differently configured between downlink and uplink. A case where the number of downlink CCs is identical with the number of uplink CCs is called a symmetric aggregation, and a case where the number of downlink CCs is different from the number of uplink CCs is called an asymmetric aggregation.

Furthermore, the sizes (i.e., bandwidths) of CCs may be different. For example, assuming that 5 CCs are used to configure a 70 MHz band, the configuration may have a form, such as 5 MHz CC (carrier #0)+20 MHz CC (carrier #1)+20 MHz CC (carrier #2)+20 MHz CC (carrier #3)+5 MHz CC (carrier #4).

A multiple carrier system hereinafter refers to a system supporting the carrier aggregation. In the multiple carrier system, the contiguous carrier aggregation or the non-contiguous carrier aggregation or both may be used. Furthermore, either the symmetric aggregation or the asymmetric aggregation may be used.

Figure 5:
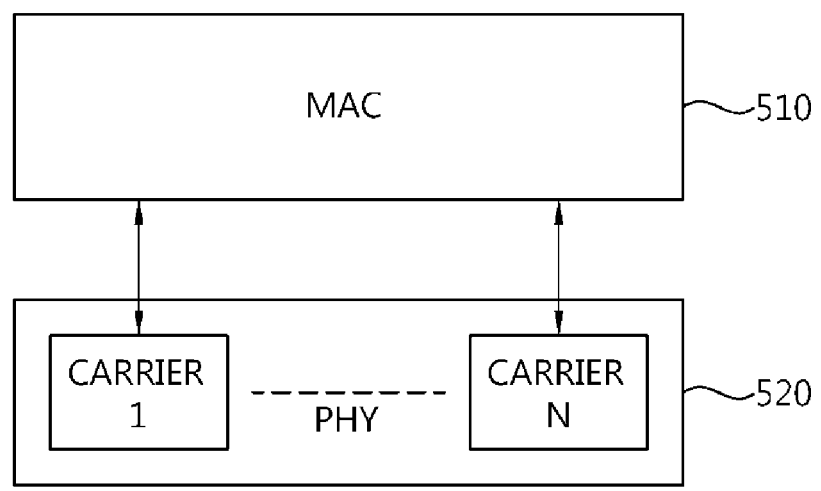
FIG. 5 shows an example of a protocol structure for supporting multiple carriers.

FIG. 5 shows an example of a protocol structure for supporting multiple carriers.

Referring to FIG. 5, a common MAC (Medium Access Control) entity 510 manages a physical layer 520 using a plurality of carriers. An MAC management message transmitted through a specific carrier may be applied to other carriers. That is, the MAC management message is a message, including the specific carrier and capable of controlling other carriers. The physical layer 520 may be operated in TDD or FDD or both.

In the physical layer 520, a PDCCH (Physical Downlink Control CHannel) through which physical control information is transmitted informs a UE of the allocation of resources of a PCH (Paging CHannel) and a DL-SCH (downlink shared channel) and of HARQ (Hybrid Automatic Repeat Request) information pertinent to the DL-SCH. The PDCCH may carry an uplink grant, informing a UE of resources allocation for uplink transmission.

A PCFICH (Physical Control Format Indicator Channel) informs a UE of the number of OFDM symbols used in PDCCHs, and it is transmitted every subframe. A PHICH (Physical Hybrid ARQ Indicator Channel) carries HARQ ACK/NAK signals in response to uplink transmission. A PUCCH (Physical Uplink Control CHannel) carries HARQ ACK/NAK signals for downlink transmission and uplink control information, such as a scheduling request and a CQI. A PUSCH (Physical Uplink Shared Channel) carries an UL-SCH (uplink shared channel).

Figure 6:
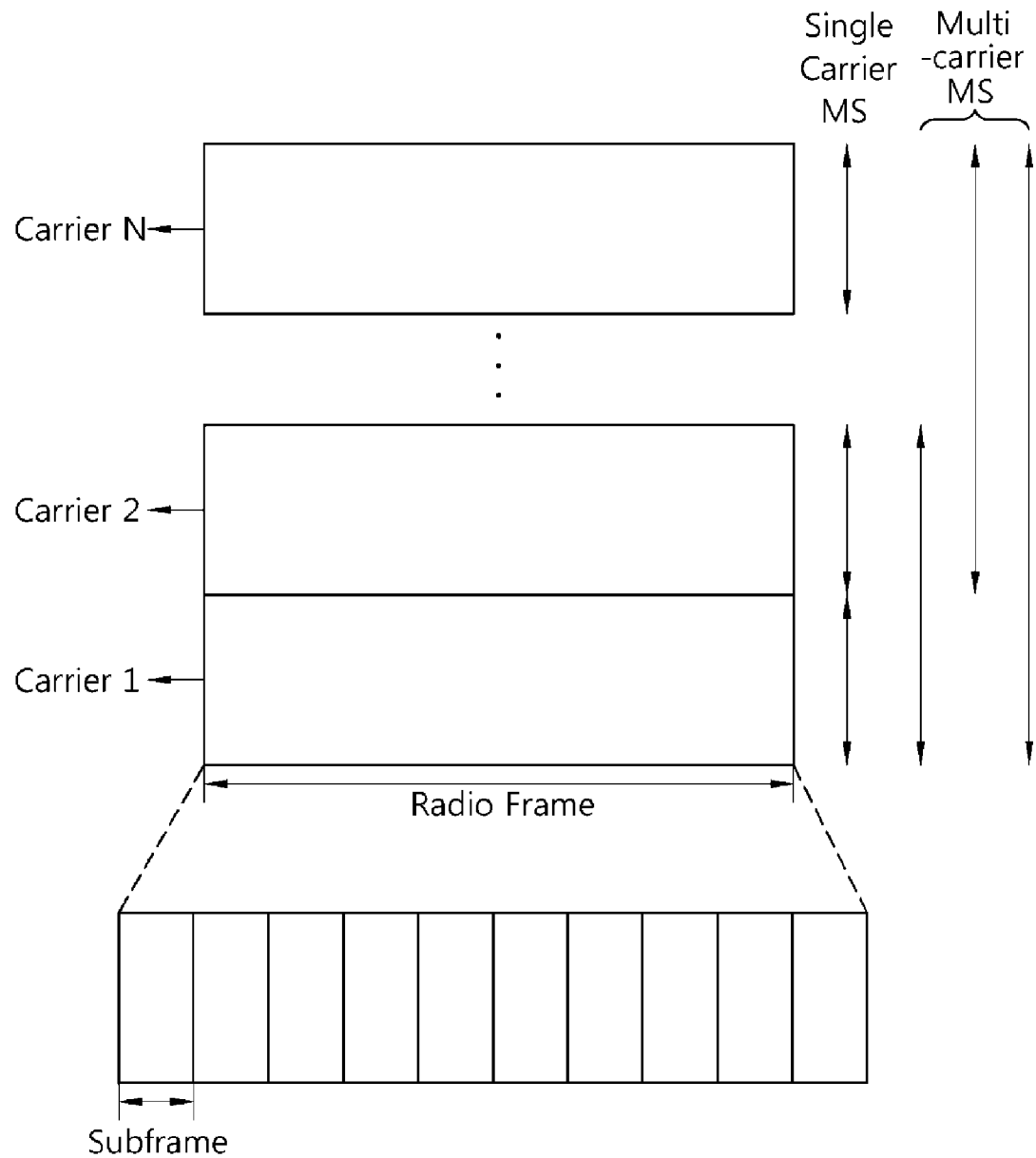
FIG. 6 shows an example of a frame structure for a multiple carrier operation.

FIG. 6 shows an example of a frame structure for a multiple carrier operation.

Referring to FIG. 6, a radio frame consists of 10 subframes. The subframe includes a plurality of OFDM symbols. Each CC may have its own control channel (e.g., PDCCH). The CCs may be contiguous to each other or may not be contiguous to each other. A UE may support one or more CCs according to its capability.

Figure 7:
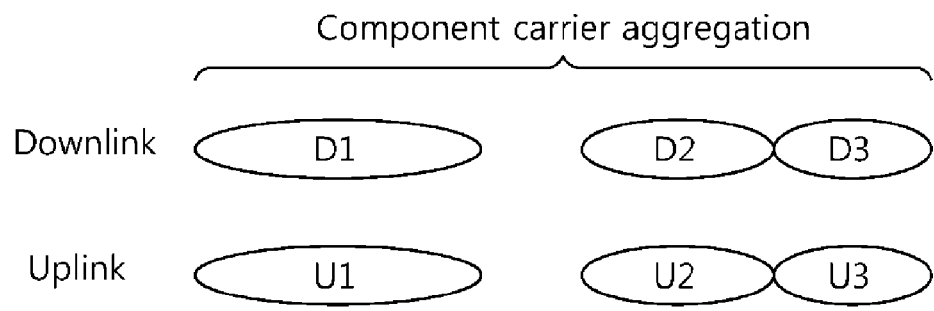
FIG. 7 shows a linkage between downlink component carriers and uplink component carriers in a multiple carrier system.

FIG. 7 shows a linkage between downlink component carriers and uplink component carriers in the multiple carrier system.

Referring to FIG. 7, in downlink, downlink component carriers (hereinafter referred to as 'DL CCs') D1, D2, and D2 are aggregated. In uplink, uplink component carriers (hereinafter referred to as 'UL CCs') U1, U2, and U3 are aggregated. Here, Di is the index of a DL CC, and Ui is the index of an UL CC (i=1, 2, 3).

In an FDD system, a DL CC and an UL CC are linked to each other in a one to one way. The D1 is linked to the U1, the D2 is linked to the U2, and the D3 is linked to the U3. A UE performs the linkage between the DL CCs and the UL CCs through system information transmitted through a logical channel BCCH or a UE-dedicated RRC message transmitted through a DCCH. Each linkage may be set up in a cell-specific way or in a UE-specific way.

Examples of an UL CC linked to a DL CC and examples of a DL CC linked to an UL CC are as follows.

1) UL CC through which a UE will send ACK/NACK information in relation to data transmitted by a BS through a DL CC, 2) DL CC through which a BS will send ACK/NACK information in relation to data transmitted by a UE through an UL CC 3) DL CC through which a BS will send a response when a BS receives a Random Access Preamble (RAP) transmitted by a UE, starting a random access procedure, through an UL CC, 4) UL CC to which uplink control information is applied when a BS sends uplink control information through a DL CC, and so on.

FIG. 7 illustrates only the example of the 1:1 linkage between the DL CC and the UL CC. It is, however, to be noted that a 1:n linkage or an n:1 linkage may also be established. Furthermore, the index of a CC is not identical with the sequence of the CC or the position of a frequency band of the CC.

Figure 8:
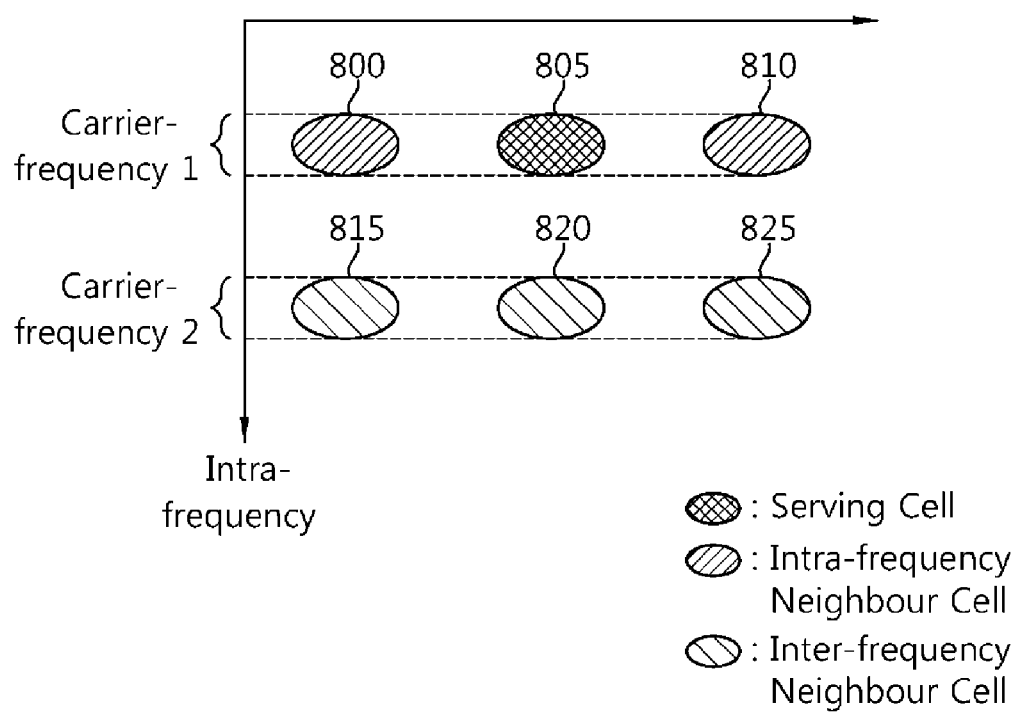
FIG. 8 is an explanatory diagram illustrating a concept of a serving cell and a neighbor cell.

FIG. 8 is an explanatory diagram illustrating a concept of a serving cell and a neighbor cell.

Referring to FIG. 8, a system frequency band is classified into a plurality of carrier frequencies. Here, the carrier frequency means the center frequency of a cell. The cell may refer to downlink frequency resources and uplink frequency resources. Alternatively, the cell may refer to a combination of downlink frequency resources and optional uplink frequency resources. Furthermore, when a CA is not taken into consideration, uplink and downlink frequency resources always exists in pairs in one cell.

Here, a serving cell 805 refers to a cell in which service is now being provided to a UE. A neighbor cell refers to a cell adjacent to the serving cell 805 geographically or on the frequency band.

Neighbor cells using the same carrier frequency on the basis of the serving cell 805 are called intra-frequency neighbor cells 800 and 810. Furthermore, neighbor cells using different carrier frequencies on the basis of the serving cell 805 are called inter-frequency neighbor cells 815, 820, and 825. That is, all cells adjacent to a serving cell, including not only cells using the same frequency as the serving cell, but cells using different frequencies from the serving cell, may be called neighbor cells.

The handover of a UE from the serving cell 805 to the intra-frequency neighbor cell 800 or 810 is called intra-frequency handover. Meanwhile, the handover of a UE from the serving cell 805 to the inter-frequency neighbor cell 815, 820, or 825 is called inter-frequency handover.

In order to send and receive packet data through a specific cell, a UE has to first complete a configuration for the specific cell. Here, the term 'configuration' refers to the reception of system information necessary to send and receive data to and from a relevant cell.

For example, the configuration may include the entire process of receiving common physical layer parameters necessary to send and receive data, MAC layer parameters, or parameter necessary for a specific operation in an RRC layer. A configuration-completed cell is in a state in which the cell can instantly send and receive packet data when it receives only signaling information indicating that the packet data can be transmitted.

Meanwhile, the cell in the configuration completion state may exist in an activation or deactivation state. The reason why the configuration completion state is divided into the activation state and the deactivation state is to enable a UE to monitor or receive a control channel (PDCCH) and a data channel (PDSCH) only in the activation state in order to minimize the battery consumption of the UE. Here, an initial state pertinent to activation right after the configuration completion is the deactivation state.

Activation means that the transmission or reception of traffic data is being performed or is in a ready state. A UE may monitor or receive a control channel (PDCCH) and a data channel (PDSCH) of an activated cell in order to check resources (e.g., frequency and time) allocated thereto.

Deactivation means that the transmission or reception of traffic data is impossible, but measurement or the transmission or reception of minimum information is possible. A UE may receive system information (SI) necessary to receive packets from a deactivated cell. However, the UE does not monitor or receive a control channel (PDCCH) and a data channel (PDSCH) of the deactivated cell in order to check resources (e.g., frequency and time) allocated thereto.

Figure 9:
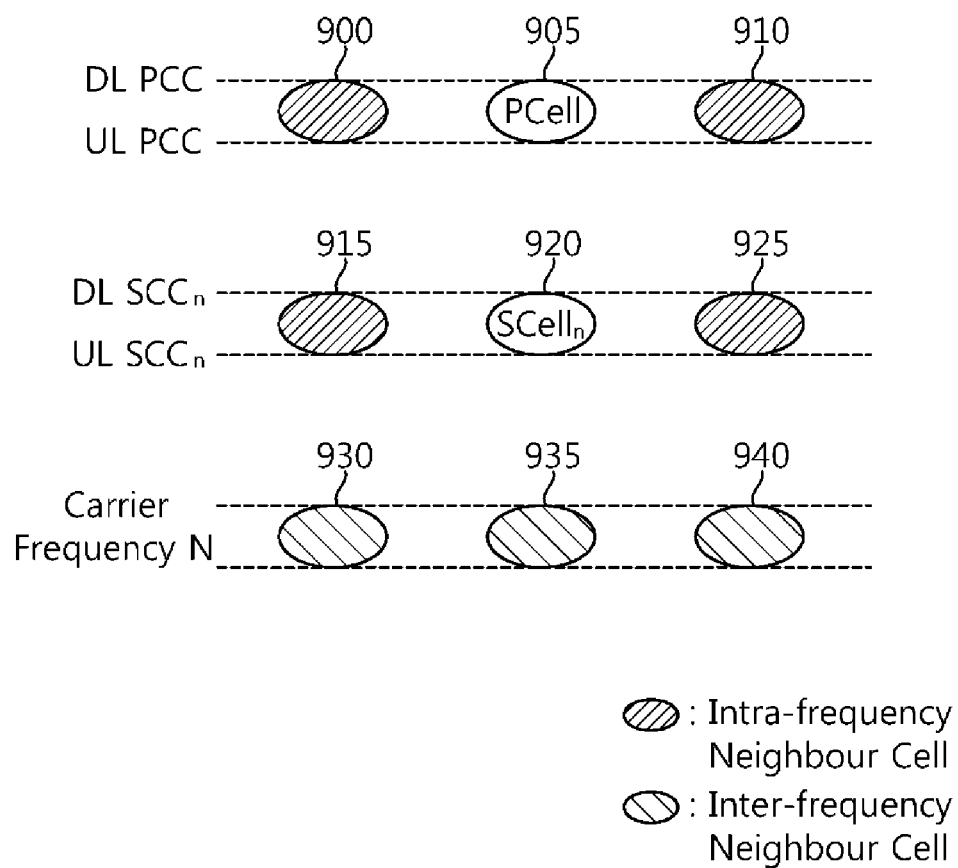
FIG. 9 is an explanatory diagram illustrating a concept of a primary serving cell and a secondary serving cell.

FIG. 9 is an explanatory diagram illustrating a concept of a primary serving cell and a secondary serving cell.

Referring to FIG. 9, a primary serving cell (PCell) 905 means one serving cell, providing security input and NAS mobility information, in an RRC connection establishment state or an RRC connection reestablishment state. According to UE capabilities, at least one cell, together with the primary serving cell 905, may be configured to form an aggregation of serving cells. The at least one cell is called a secondary serving cell (SCell) 920.

Accordingly, the aggregation of serving cells configured for one UE may include only the one primary serving cell 905 or may include the one primary serving cell 905 and the at least one secondary serving cell 920.

Each of the intra-frequency neighbor cells 900 and 910 of the primary serving cell 905 and the intra-frequency neighbor cells 915 and 925 of the secondary serving cell 920 belongs to the same carrier frequency. Furthermore, the inter-frequency neighbor cells 930, 935, and 940 of the primary serving cell 905 and the secondary serving cell 920 belong to different carrier frequencies.

A DL CC corresponding to the primary serving cell 905 is called a downlink primary component carrier (hereinafter referred to as a 'DL PCC'), and an UL CC corresponding to the primary serving cell 905 is called an uplink primary component carrier (hereinafter referred to as an 'UL PCC'). Furthermore, in downlink, a component carrier corresponding to the secondary serving cell 920 is called a downlink secondary component carrier (hereinafter referred to as a 'DL SCC'). In uplink, a component carrier corresponding to the secondary serving cell 920 is called an uplink secondary component carrier (hereinafter referred to as an 'UL SCC').

The PCC is a CC initially subjected to connection or RRC connection to a UE, from among several CCs. The PCC is a special CC which is responsible for connection or RRC connection for signaling relating to a plurality of CCs and manages a UE context (i.e., connection information related to the UE). Furthermore, the PCC always exists in the activation state, when the PCC is connected to a UE and is in an RRC connected mode.

The SCC is a CC allocated to a UE other than the PCC. The SCC is a carrier extended by a UE for the allocation of additional resources other than the PCC and may be divided into an activation state or a deactivation state. An initial state of the SCC is the deactivation state.

The primary serving cell 905 and the secondary serving cell 920 have the following characteristics.

First, the primary serving cell 905 is used for the transmission of a PUCCH.

Second, the primary serving cell 905 is always activated, whereas the secondary serving cell 920 is activated or deactivated according to a specific criterion.

Third, when the primary serving cell 905 experiences a Radio Link Failure (RLF), RRC connection reestablishment is triggered. However, when the secondary serving cell 920 experiences an RLF, RRC connection reestablishment is not triggered.

Fourth, the primary serving cell 905 may be changed by changing a security key or may be changed by a handover procedure accompanied by a Random Access Channel (RACH) procedure.

Procedures, such as the reconfiguration, addition, and removal of the secondary serving cell 920, may be performed by an RRC layer. In adding a new secondary serving cell 920, RRC signaling may be used to send system information about a dedicated secondary serving cell.

In handover in which a carrier aggregation is taken into consideration, the primary serving cell 905 and the secondary serving cell 920 have to be taken into consideration at the same time. For example, when the primary serving cell 905 changes to the secondary serving cell 920 within the same BS, it is intra-BS (or intra-eNB) handover. When the primary serving cell 905 changes to a specific cell 920 within another BS, it is inter-BS (or inter-eNB) handover.

Meanwhile, a DL CC may form one serving cell, and a DL CC and an UL CC are linked to form one serving cell. However, a serving cell is not formed by only one UL CC. For example, a DL CC1 and an UL CC1 may be linked together to form the primary serving cell 905. Furthermore, a DL CC2 and an UL CC2 may be linked together to form the one secondary serving cell 920. Accordingly, communication performed between a UE and a BS through a DL CC or an UL CC in a carrier system has the same concept as communication performed between a UE and a BS through a serving cell. For example, when a UE performs measurement accompanied by handover, a measurement report for a CC may be seen as the same concept as a measurement report for the primary serving cell 905 or the secondary serving cell 920. For the unity of a description, it is hereinafter assumed that the measurement report of a UE is for a serving cell.

In handover using a plurality of CCs, two factors have to be taken into consideration. One of the factors is to maintain a service state for a UE, and the other thereof is to select a cell which will maintain a service state. If it sought to maintain the service state of the UE even in a target BS when handover is performed, a source BS and the target BS has to check the service state of the UE collectively and then to perform the handover based on the checked service state. Information collectively indicative of the service state of the UE as described above is called service state information.

Next, the selection of a cell for maintaining a service state includes selection made by a source BS and selection made by a target BS. At least one serving cell selected by a source BS is called a candidate cell, and a list including information about a candidate cell is called a candidate cell list. At least one serving cell selected by a target BS is called a final cell, and a list including information about a final cell is called a final cell list. A source BS selects a candidate cell according to several criteria. A target BS selects a final cell for maintaining a service state according to service state information, from candidate cells. That is, a serving cell is selected based on a hierarchical scheme, such as a cell→the selection of a candidate cell→the selection of a final cell.

The two factors to be taken into consideration have to be satisfied by signaling between a UE and a source BS, signaling between the UE and a target BS, and signaling between the source BS and the target BS, in a handover procedure. In particular, the signaling between a source BS and a target BS may be performed through the X2 interface.

Service state information for handover, a candidate cell, and a final cell according to the present invention are described in connection with a signaling flowchart between a UE, a source BS, and a target BS.

Figure 10:
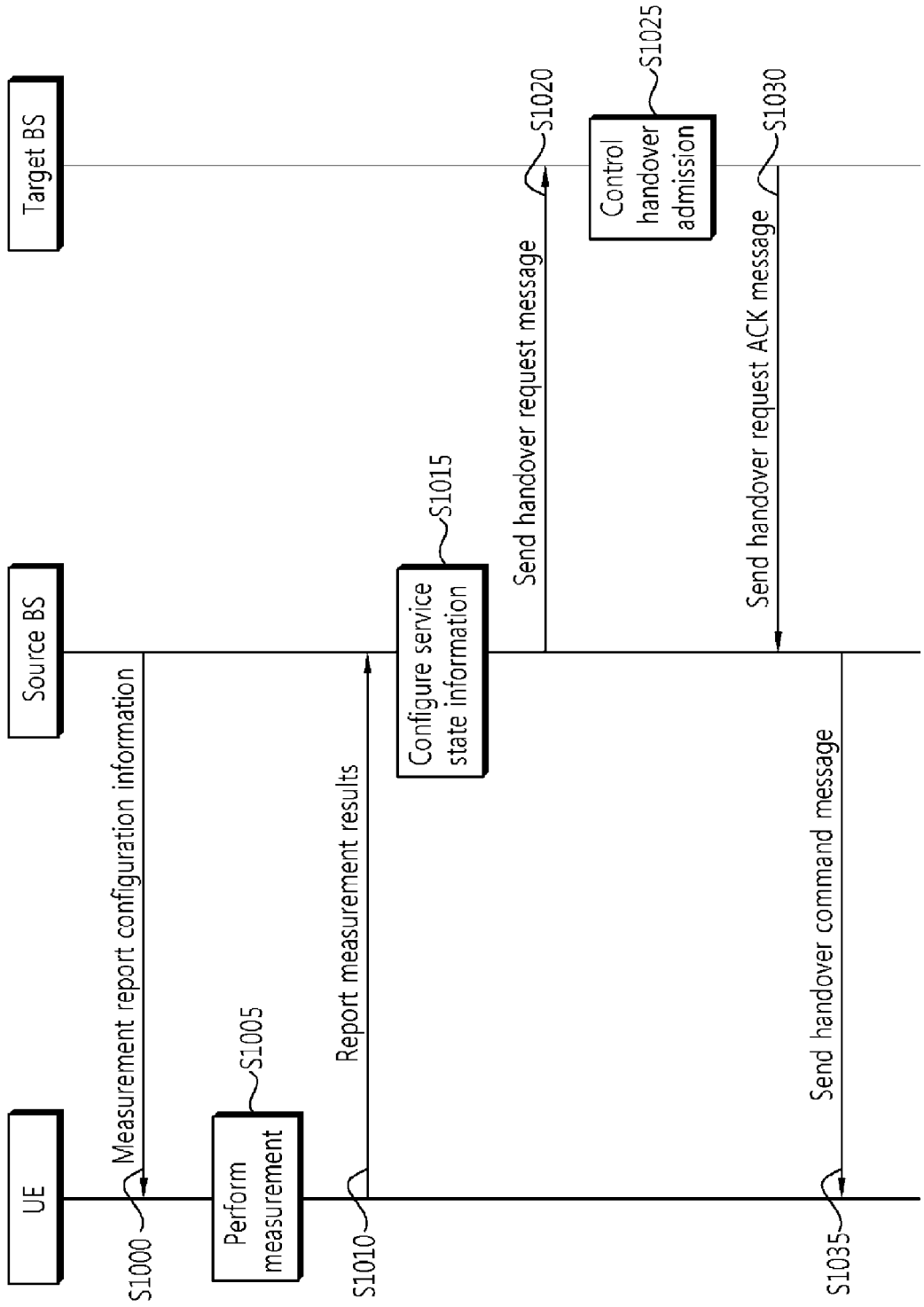
FIG. 10 is a flowchart illustrating a method of performing handover according to an example of the present invention.

FIG. 10 is a flowchart illustrating a method of performing handover according to an example of the present invention.

Referring to FIG. 10, a source BS sends measurement report configuration information to a UE at step S1000. The measurement report configuration information may be provided in the form of UE-dedicated signaling, such as an RRC connection reconfiguration message. The measurement report configuration information is control information used to configure a criterion and a format for performing a measurement report in a UE. The criterion on which the measurement report is performed may be a specific period or may be triggering according to a specific event.

Here, the source BS may indicate quantities, used by the UE in order to evaluate a triggering criterion for the measurement report, through the measurement report configuration information. The quantities may be, for example, Reference Signal Received Power (RSRP) or Reference Signal Received Quality (RSRQ).

The UE performs measurement based on the measurement report configuration information at step S1005. The UE measures a signal transmitted by a primary serving cell and, when a measurement report is triggered by the measurement results, reports the measurement results to the source BS at step S1010. The measurement report may be triggered according to a triggering criterion of the measurement report which is set in a system, such as when a channel state is a specific threshold or less or when a channel state is a specific threshold or higher. The reported measurement results refer to measurement values relating to measurable factors, such as the RSRP, the RSRQ, and the power level of a cell which are determined based on the measurement report configuration information.

The source BS configures service state information based on the reported measurement results at step S1015. The service state information includes information, indicating that the UE preparing to perform handover informs a target BS of a state of service received from the source BS.

The service state information may include elements, such as those shown in Table 1 below.

TABLE 1

| Element | Description |
|---|---|
| Candidate Cell List | Information for Candidate Cells or Measurement Results for Candidate Cells or both |
| AT | (Maximum Term) Average Throughput |
| GBR | Guaranteed Bit Rate |
| AMBR | UE Aggregated Maximum Bit Rate, Maximum UE Bit Rate |
| The number of CCs for SeNB | The number of CCs used by SeNB |
| UE Capability | Available CCs (e.g., the number of CCs and frequency for CC) |
| Measurement Results | RSRP or RSRQ |

Referring to Table 1, the service state information may include the candidate cell list, the average throughput, the Guaranteed Bit Rate (GBR), the UE Aggregated Maximum Bit Rate (UE AMBR or AMBR), the number of CCs for a source BS (SeNB), the UE capability, information about CCs included in the candidate cell list, and the RSRP or the RSRQ for measurement-reported cells.

The candidate cell list is configured by a source BS. The candidate cell list is information, including a list in which a target BS defines at least one candidate cell that may become a primary serving cell or a secondary serving cell relating to a UE or the measurement results of the at least one candidate cell or both.

That is, the source BS configures a list, including at least one candidate cell appropriate for a UE with consideration taken of a current service state of the UE to be handovered, and informs the target BS of the configured list.

The target BS may select at least one cell from candidate cells included in the candidate cell list as a final primary serving cell or a final secondary serving cell by collectively referring to the service state information.

In Table 1, the average throughput is provided by a source BS in order to service a UE. In the case of a UE in which a carrier aggregation is supported, the average throughput may be checked as a total throughput supported through several CCs.

A radio bearer may be chiefly configured according to two kinds. That is, a radio bearer for which the bit rate of a certain level must be guaranteed and a radio bearer having no limits to the bit rate to be guaranteed may be configured.

The radio bearer for which the bit rate of a certain level must be guaranteed is called a GBR bearer. The GBR is a bit rate that must be guaranteed in order to provide a specific service. The GBR may be applied when admission control for a target BS is performed or when a bearer is configured upon VoIP service or handover. The GBR is a value for providing a minimum QoS for service provided to a specific bearer. A GBR having a minimum value is called a minimum GBR. A bearer for which the minimum GBR is set is called a minimum GBR bearer. For the minimum GBR bearer, certain resources may be permanently allocated. The GBR value may be differently allocated to each bearer. Alternatively, the sum of minimum GBR values allocated to all GBR bearers may be determined as the GBR value.

Meanwhile, the radio bearer having no limits to the bit rate to be guaranteed is called a non-Guaranteed Bit Rate (Non-GBR) bearer. Here, the non-GBR means that the bit rate that must be guaranteed in order to provide a specific service is not set. The non-GBR may be applied to services, such as a web browsing File Transfer Protocol (FTP). For the non-GBR bearer, resources need not to be permanently allocated.

The AMBR or the UE AMBR is a maximum bit rate that may be allocated by a system to the highest degree in order to provide a specific service and services. The AMBR or the UE AMBR is a maximum bit rate that may be allocated to a UE other than the GBR bearer.

For example, if the AMBR is set to 1000 bits, a maximum available bit rate of non-GBR bearers is 1000 bits. If only one non-GBR bearer exists, the non-GBR bearer can be supported by a maximum throughput of 1000 bits. Packets exceeding the maximum throughput of 1000 bits may be dropped.

The measurement results refer to measurement values relating to measurable factors, such as the RSRP, the RSRQ, and the power level of a cell which are determined based on the measurement report configuration information. The measurement results refer to information necessary for a source BS to configure a candidate cell list.

The service state information is information collectively indicative of a state in which a UE is served by a source BS. The service state information may further include pieces of information for the QoS of a UE between a source BS and a target BS, in addition to the pieces of information listed in Table 1. For example, the service state information may include the measurement report of a UE without change.

A source BS sends a handover request message, including the service state information, to the target BS at step S1020. The handover request message is a message, requesting the target BS to prepare for resources for handover.

The target BS which has received the handover request message may determine handover with consideration taken of its current system load state and radio situations at step S1025. At this step, if the handover request message includes a candidate cell list, the target BS stores information about the candidate cell list in a UE context and selects final cells from candidate cells, included in the candidate cell list, by taking the service state information into consideration. This may be performed in a handover admission control process. The target BS may provide the selected final cells to the source BS in the form of a list. The list, including information about the selected final cells, is called a final cell list.

The target BS sends a handover request ACK message to the source BS at step S1030. The handover request ACK message is a message, informing the source BS that the preparation of resources for handover by means of the target BS has been completed. The handover request ACK message may further include the final cell list determined by the target BS.

If handover resource allocation is not successful because there are no available resources on the part of the target BS, the target BS may send not the handover request ACK message, but a handover preparation failure message to the source BS.

When the handover request ACK message is received, the source BS informs the start of handover by sending a handover command message to the UE at step S1035.

When a UE performs handover, a source BS primarily selects candidate cells suitable for the UE and informs a target BS of service state information, including a candidate cell list including the candidate cells. The target BS secondarily selects a cell suitable for the UE, from the candidate cells, based on the service state information. Accordingly, QoS for the UE can be guaranteed to the highest degree.

Figure 11:
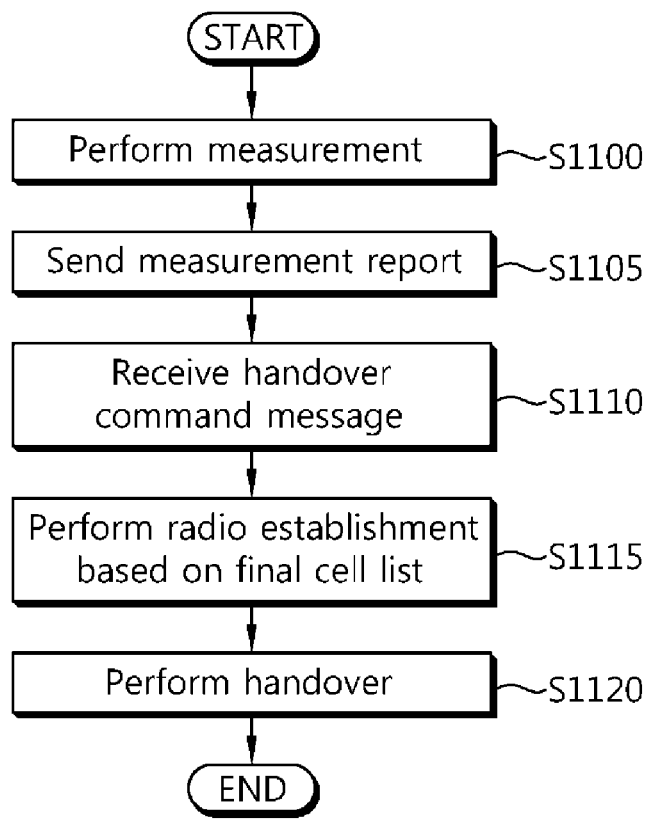
FIG. 11 is a flowchart illustrating a method of a UE performing handover according to the present invention.

FIG. 11 is a flowchart illustrating a method of a UE performing handover according to the present invention.

Referring to FIG. 11, the UE performs measurement at step S1100. The UE may perform the measurement for all cells or for each cell. Alternatively, the UE may perform the measurement for some predetermined cells.

The UE sends a measurement report, including collected measurement results, to a source BS at step S1105. Here, the measurement report may be included in service state information without change. Furthermore, as described above, the service state information may be configured in a form, such as that shown in Table 1.

Next, the UE receives a handover command message from the source BS at step S1110. The handover command message may be included in an RRC connection reestablishment message and then transferred from the source BS to the UE. The handover command message may include a final cell list determined by a target BS.

The source BS may transfer the final cell list, received from the target BS, to the UE without change or may selectively transfer some pieces of information of the final cell list to the UE. For example, the source BS may designate a cell which will perform RRC connection establishment or RRC connection reestablishment in the final cell list.

The UE performs RRC connection establishment or RRC connection reestablishment for the determined cell in response to the received handover command message at step S1115.

More particularly, the UE checks information about a primary serving cell and a secondary serving cell set by a target BS by checking the final cell list included in the handover command message. As described above, the target BS may write the final cell list including a cell (or cells) selected from candidate cells included in a candidate cell list, written and sent by the source BS. The candidate cell list may be written on the basis of the measurement results performed by the UE. Accordingly, the UE may perform handover to a cell optimized for his current state or capability. The UE may previously perform RRC connection establishment or RRC connection reestablishment for the primary serving cell and the secondary serving cell to be used in the target BS, from among the cells listed in the final cell list. Here, the primary serving cell and the secondary serving cell to be used in the target BS, as described above, may be cells designated by the source BS in the final cell list.

The established or RRC-reestablished cells may have their initial states set to a deactivation state or an activation state according to a relevant cell. Since a cell (or cells) to be handovered can be previously activated or deactivated as occasion demands, not only a handover procedure can be performed more smoothly, but also subsequent communication between the target BS and the UE can be performed more smoothly.

The UE performs to the RRC-established or RRC-reestablished cell at step S1120. First, if the same cell as the primary serving cell in the source BS is included in the final cell list, the UE may attempt handover to the same cell as the primary serving cell in the source BS. In this case, the UE can easily maintain QoS serve by the source BS. If handover to the same cell as the primary serving cell in the source BS is not easy (e.g., when handover to the same cell as the primary serving cell in the source BS is unsuccessful or when the same cell as the primary serving cell in the source BS is not included in the final cell list), the UE may attempt handover to another cell. Another cell may be the same cell as a secondary serving cell in the source BS. In relation to the cell to which handover will be performed, the UE may have previously prepared for RRC connection establishment or RRC connection reestablishment or the activation or deactivation of the relevant cell, as described above, and may perform a handover procedure or a communication procedure or both smoothly.

Figure 12:
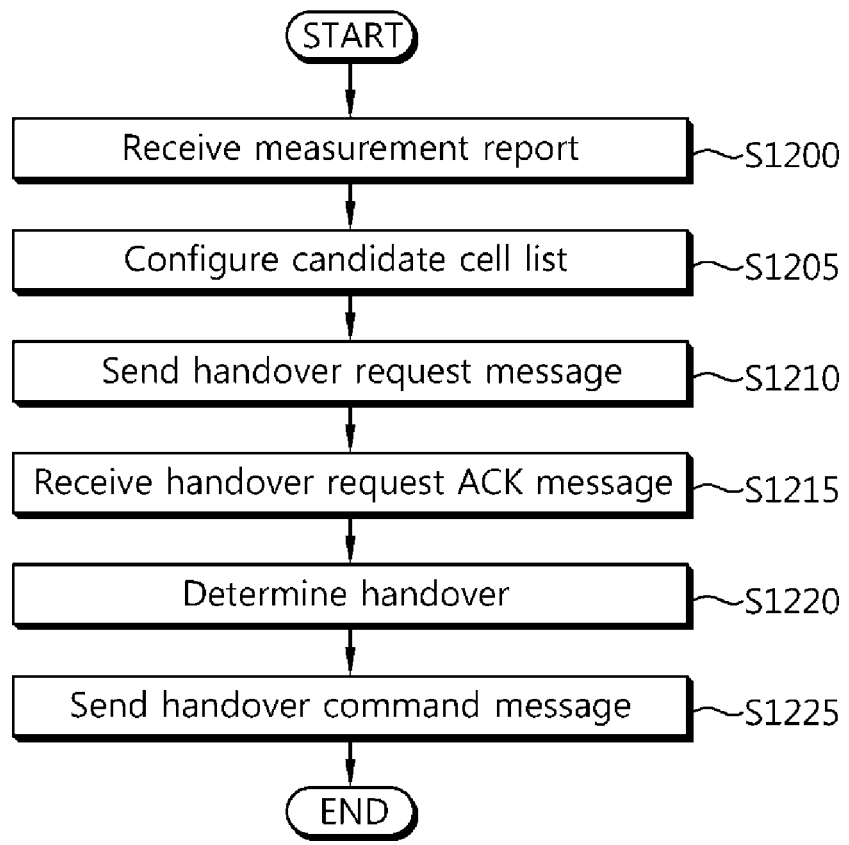
FIG. 12 is a flowchart illustrating a method of a source BS performing handover according to the present invention.

FIG. 12 is a flowchart illustrating a method of a source BS performing handover according to the present invention.

Referring to FIG. 12, the source BS receives a measurement report from a UE at step S1200. The measurement report includes measurement results for a cell (or frequency) configured in the UE.

The source BS configures a candidate cell list, including at least one candidate cell, based on the measurement results at step S1205. The candidate cell list is a list listing at least one candidate cell which may become a primary serving cell or a secondary serving cell regarding the UE in a target BS.

It is preferred that the candidate cell list be configured so that a service state of the UE can be taken into consideration to the highest degree. To this end, the candidate cell list has to be configured with consideration taken of factors affecting the service state of the UE. The factors affecting the service state of the UE may include the number of bands allocated to the source BS or the UE, whether a carrier aggregation is supported, a frequency characteristic, and so on. The candidate cell lists of various forms may be induced by taking the factors into account.

As described above, from a viewpoint of a multiple component carrier system, a candidate cell may correspond to a candidate CC, and thus a candidate cell list may be said to be a candidate CC list. For this reason, a candidate CC and a candidate CC list may also be exchangeably used as a candidate cell and a candidate cell list, respectively, for convenience of description.

For example, a candidate cell list may include cells having up to an upper $M^{th}$ measurement value, from among a total of N cells (M<N). In this case, the M cells are included in the candidate cell list. The candidate cell list includes indices of the M cells, measurement result values (dB) of the M cells, and/or codes indicating the M cells.

For another example, the candidate cell list may include Q cells each having a measurement value greater than a threshold, from among a total of P cells (Q≤P). Here, the candidate cell list includes indices of the Q cells or codes of the Q cells or both.

For yet another example, the candidate cell list may inform the priority of each cell determined based on a measurement value. That is, the candidate cell list may be configured so that cells are arranged in order from the greatest measurement value to the smallest measurement value according to a top-down method or may be configured so that cells are arranged in order from the smallest measurement value to the greatest measurement value according to a bottom-up method. For example, it is assume that measurement values of cells A, B, C, D, and E are given as in Table 2. Here, the measurement values are quantities, such as an RSRP or an RSRQ, and may be dB values.

TABLE 2

| Cell | Measurement Value |
|------|-------------------|
| A | 10 |
| B | 7 |
| C | 3 |
| D | 12 |
| E | 8 |

Referring to Table 2, when the candidate cells are arranged according to the top-down method, it leads to the sequence of the cell D, the cell A, the cell E, the cell B, and the cell C. A candidate cell list according to the top-down method becomes a list, such as that shown in Table 3.

TABLE 3

| Cell | Carrier Frequency |
|------|-------------------|
| D | $f_4$ |
| A | $f_1$ |
| E | $f_5$ |
| B | $f_2$ |
| C | $f_3$ |

Candidate Cell List

Here, the carrier frequency may be called the center frequency of a cell or the center frequency of a CC. Referring to Table 3, the carrier frequencies of the cells A, B, C, D, and E are an $f_1$ MHz, an $f_2$ MHz, an $f_3$ MHz, an $f_4$ MHz, and an $f_5$ MHz, respectively.

When the candidate cells are arranged according to the bottom-up method, it leads to the sequence of the cell C, the cell B, the cell E, the cell A, and the cell D. Accordingly, a candidate cell list according to the bottom-up method becomes a list, such as that shown in Table 4.

TABLE 4

| Cell | Carrier Frequency |
|------|-------------------|
| C | $f_3$ |
| B | $f_2$ |
| E | $f_5$ |
| A | $f_1$ |
| D | $f_4$ |

Candidate Cell List

For yet another example, the candidate cell list may indicate the priority of a measurement value of a cell for each operating band. For example, the candidate cell list, as shown in Table 5, may be configured so that candidate cells are arranged in order of a better RSRP or RSRQ for each of operating bands $F_1$ and $F_2$. Here, the operating band refers to a frequency band allocated to a UE for each operator or for each communication system. From Table 5, it can be seen that cells A and B belong to the operating frequency $F_1$, and cells C, D, and E belong to the operating frequency $F_2$.

TABLE 5

Candidate Cell List

| Band Index | Cell | Carrier Frequency |
|------------|------|-------------------|
| 4 (Index of $F_1$) | A | $f_1$ |
|  | B | $f_2$ |
| 9 (Index of $F_2$) | C | $f_3$ |
|  | D | $f_4$ |
|  | E | $f_5$ |

For yet another example, the candidate cell list may be an aggregatable cell list indicative of information about aggregatable cells. For example, the candidate cell list, as shown in Table 6, may include an aggregatable group index in which aggregatable cells from among all candidate cells are grouped, a cell index belonging to an aggregatable group, and a carrier frequency.

TABLE 6

| Aggregatable Cell List | | |
|---|---|---|
| Aggregatable Group Index | Cell | Carrier Frequency |
| 1 | A | $f_1$ |
|  | B | $f_2$ |
| 2 | C | $f_3$ |
|  | D | $f_4$ |
|  | E | $f_5$ |

For yet another example, the candidate cell list, as shown in Table 7, may be a sensible cell list in which cells having the same or similar frequency characteristic are grouped based on a criterion of a specific frequency characteristic.

TABLE 7

| Sensible Cell List | | |
|---|---|---|
| Sensible Group Index | Cell | Carrier Frequency |
| 1 | A | $f_1$ |
|  | B | $f_2$ |
| 2 | C | $f_3$ |
|  | D | $f_4$ |
|  | E | $f_5$ |

The source BS includes service state information, including at least one list among the candidate cell lists, in a handover request message and sends the handover request message to the target BS at step S1210. As described above, the candidate cell list may be included in the service state information and transmitted to the target BS. Furthermore, the transmitted service state information may be included in the measurement report of the UE without change or may be configured in a form, such as that shown in Table 1.

The source BS receives a final cell list, including a final cell (or cells) selected by the target BS in response to the handover request message, from the target BS through a handover request ACK message at step S1215.

The handover request message and the handover request ACK message exchanged between the source BS and the target BS may be transmitted or received through a backbone network and may be transmitted or received through, in particular, the X2 interface.

Next, the source BS finally determines the handover of the UE at step S1220 and sends information about the final cell (or cells), included in the final cell list, to the UE through a handover command message at step S1225.

Figure 13:
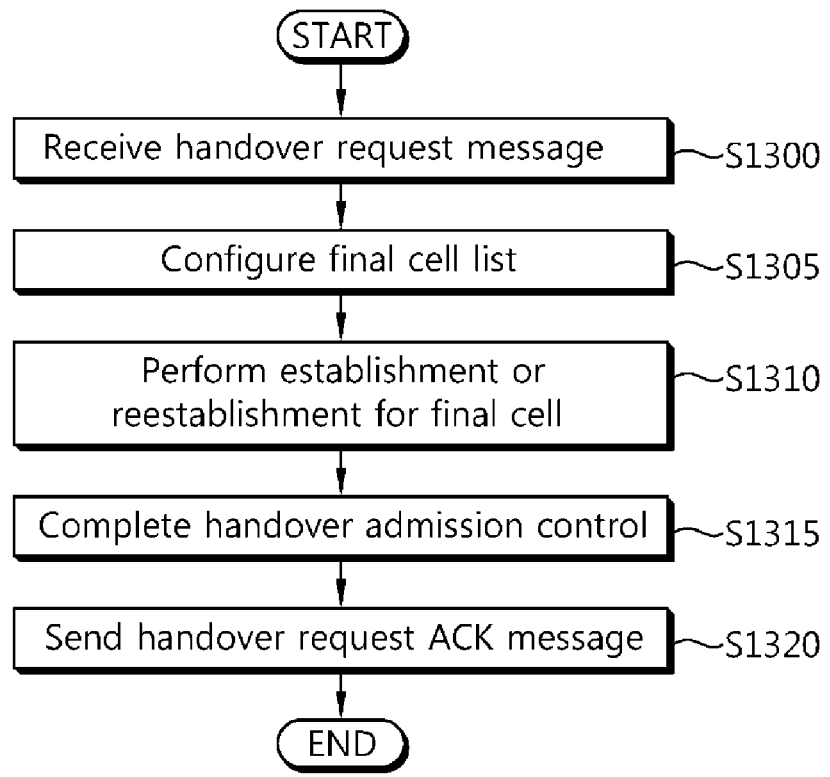
FIG. 13 is a flowchart illustrating a method of a target BS performing handover according to the present invention.

FIG. 13 is a flowchart illustrating a method of a target BS performing handover according to the present invention.

Referring to FIG. 13, the target BS receives a handover request message, including service state information, from a source BS at step S1300. The service state information includes a candidate cell list for a specific UE. The candidate cell list may be one of a sensible cell list and an aggregatable cell list. As described above, the service state information may be included in a measurement report, configured by the UE, without change.

The target BS checks the suitability of several candidate cells included in the candidate cell list and may reconfigure candidate cells as occasion demands. The target BS selects a final cell (or cells) determined to be most suitable for the UE. If the service state information includes the measurement report configured by the UE, the target BS may select the final cell (or cells) by taking measurement values, included in the measurement report, into consideration.

The target BS configures a final cell list including information about the selected final cell (or cells) at step S1305. Here, in order to select the final cell (or cells), a service state of the UE has to be collectively taken into consideration. Accordingly, the target BS may select the final cell (or cells) based on received candidate cells with consideration taken of a GBR, an average throughput, a non-GBR, and an AMBR which are included in the service state information. If the service state information is included in the measurement report configured by the UE, measurement values included in the measurement report may also be taken into consideration. Thus, the target BS may configure the final cell list including the selected final cell (or cells).

The target BS performs establishment or reestablishment for the final cell (or cells) included in the final cell list at step S1310. Here, the established or reestablished candidate cell may be a primary serving cell or a secondary serving cell.

Next, the target BS completes handover admission control at step S1315 and sends a handover request ACK message, including the final cell list, to the source BS at step S1320.

A method of configuring a final cell list according to the present invention is described below.

Figure 14:
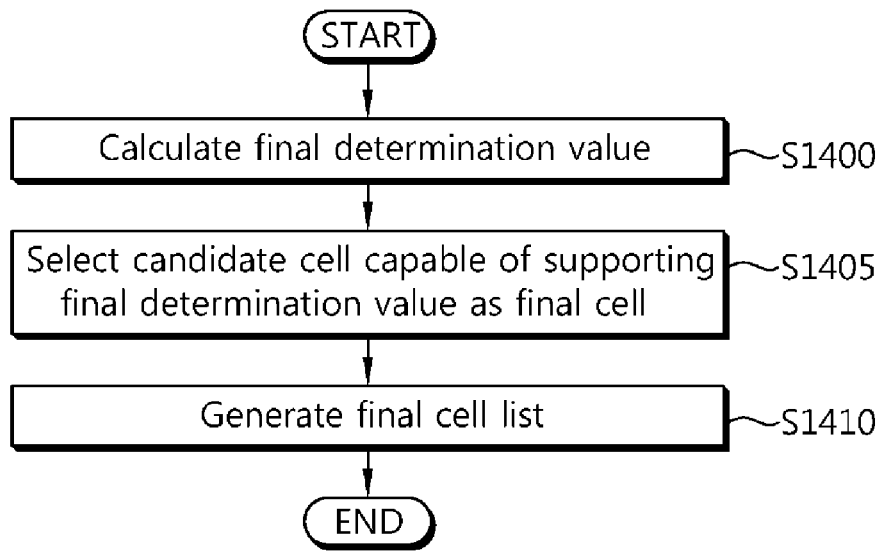
FIG. 14 is a flowchart illustrating a method of a target BS configuring a final cell list according to an example of the present invention.

FIG. 14 is a flowchart illustrating a method of a target BS configuring a final cell list according to an example of the present invention.

Referring to FIG. 14, the target BS calculates a final determination value based on service state information at step S1400. The final determination value is a value (i.e., a criterion for determining a final cell) and may be represented by the bit rate or the throughput.

For example, in order for a candidate cell to be selected as a final cell, a GBR or an average throughput of the candidate cell must be equal to the final determination value or must fall within a range of the final determination value.

Here, the service state information, as in Table 1, includes a candidate cell list, an average throughput, a Guaranteed Bit Rate (GBR), a UE aggregated maximum bit rate (AMBR), the number of CCs for a source BS (SeNB), and UE capability. Furthermore, the pieces of measurement information may be included in the service state information, including a measurement report configured by a UE, and may be used to calculate the final determination value.

The target BS may calculate the final determination value based on at least one of the average throughput, the GBR, and the AMBR included in the service state information.

Furthermore, as an example of the method of finding a final determination value, the following Equation may be used.

$$GBR \leq X \leq GBR + AMBR \quad \text{Equation 1}$$

Here, X is the final determination value. That is, the final determination value is found as a value between a total GBR and the sum (GBR+AMBR) of the total GBR and the AMBR. For example, assuming that the GBR is 400 bits and the AMBR is 100 bits, the final determination value becomes a value corresponding to the range of 400 bits to 500 bits.

Here, the GBR is a minimum bit rate that must be always supported even after handover in order to supply service to the UE. Furthermore, the AMBR is a maximum bit rate that must be supported for non-guaranteed bearers.

Accordingly, the target BS may continue to maintain a service state prior to handover only when a bit rate greater than the GBR is supported even though the final determination value is smaller than the sum of the GBR and the AMBR. That is, the target BS may select a certain serving cell (or cells) which can guarantee the QoS of the UE to the highest degree by using the GBR and the AMBR of the UE.

Furthermore, as another example of the method of finding a final determination value, the final determination value may be determined using the average throughput as in Equation 2.

$$X \geq AT \quad \text{Equation 2}$$

Here, the average throughput (AT) is an average throughput of packets which are used for the UE in the source BS. The average throughput is found as the throughput average for a certain period of time. It may correspond to a case where the target BS determines that a service state of the UE can be maintained even when the average throughput supported in the source BS remains intact even after handover. That is, the target BS selects the certain serving cell (or cells) which can guarantee the QoS of the UE based on the average throughput.

The target BS selects a candidate cell capable of supporting the final determination value as a final cell by taking criteria for selecting the final determination value, such as the equation described above, into consideration at step S1405. Here, in order for a specific candidate cell to be selected as the final cell, the bit rate or throughput of the candidate cell must be equal to the final determination value or must fall within the range of the final determination value. The selected final cell may be a primary serving cell or a secondary serving cell.

For example, it is assumed that the final determination value according to the bit rate of each candidate cell and the service state information of a UE is given as in Table 8 below.

TABLE 8

| Candidate Cell | Bits/Second | Final Determination Value |
|---|---|---|
| Cell 1 | 100 | GBR ≤ X ≤ GBR + AMBR |
| Cell 2 | 180 | |
| Cell 3 | 300 | |
| Cell 4 | 370 | |
| Cell 5 | 450 | |

For example, in Case 1, a case where the final determination value is found based on a GBR and an AMBR is taken into consideration. Furthermore, it is assumed that the GBR is 200 bits/second and the AMBR is 200 bits/second. In this case, the final determination value has a value ranging from 200 to 400 (unit bits/second).

In Case 1, the bit rates of the cell 1 and the cell 2 are 100 bits/second and 180 bits/second, respectively, which are smaller than the smallest value (i.e., 200), and they do not belong to the range of the final determination value. Accordingly, in Case 1, the cell 1 and the cell 2 cannot be selected as final cells. The bit rates of the cell 3 and the cell 4 are 300 bits/second and 370 bits/second, respectively, which belong to the range of the final determination value. Accordingly, the cell 3 and the cell 4 may be selected as final cells. Meanwhile, the bit rate of the cell 5 is 450 bits/second greater than the maximum value (i.e., 400), and thus the cell 5 cannot be selected as a final cell.

According to the above scheme, the target BS may select each of the cell 3 and the cell 4 (or both the cell 3 and the cell 4) in Case 1 as a final cell (or final cells).

In some embodiments, if the bit rates of the cell 1 and the cell 2 are added, the added bit rate belongs to the range of the final determination value. In this case, the target BS may select both the cell 1 and the cell 2 as final cells. Here, the cell 1 and the cell 2 are selected as final cells which can simultaneously provide service to the UE.

Case 2 corresponds to a case where the final determination value is found based on the average throughput. Case 2 is described by taking Table 9 as an example.

TABLE 9

| Candidate Cell | Bits/second | Final Determination Value |
|---|---|---|
| Cell 1 | 150 | X ≥ AT |
| Cell 2 | 180 | |
| Cell 3 | 300 | |
| Cell 4 | 370 | |
| Cell 5 | 450 | |

Here, it is assumed that an average throughput is, for example, 300 bits/second.

Referring to Table 9, the throughputs of the cell 1 and the cell 2 are 150 bits/second and 180 bits/second, respectively, which are smaller than the set final determination value. Accordingly, each of the cell 1 and the cell 2 cannot be selected as a final cell. However, if there is no restriction in selecting only one cell, both the cell 1 and the cell 2 may be selected as final cells. That is, the sum (i.e., 330 bits/second) of the throughputs of the cell 1 and the cell 2 exceeds the set average throughput. Accordingly, both the cell 1 and the cell 2 may be selected as final cells for supporting service of a UE.

Meanwhile, the throughputs of the cell 3, the cell 4, and the cell 5 are 300 bits/second, 370 bits/second, and 450 bits/second, respectively, which are equal to or greater than the set final determination value. Accordingly, the target BS may select the cell 3, the cell 4, and the cell 5 as a final cell (or cells).

As described above, a final cell for a candidate cell may be differently selected according to the type and criterion of a final determination value.

The target BS generates a final cell list including information about the selected final cell (or cells) at step S1410. The information about the final cell (or cells) may include at least one of a logical or physical index and a carrier frequency of the selected final cell. Furthermore, the final cell list includes information about the selected at least one final cell.

Here, the final determination value may be found using methods other than the methods described at step S1400 of FIG. 14. Other methods of finding the final determination value are described below. If the final determination value has a different type, a method of selecting a final cell (or cells) is different. This is described below.

Figure 15:
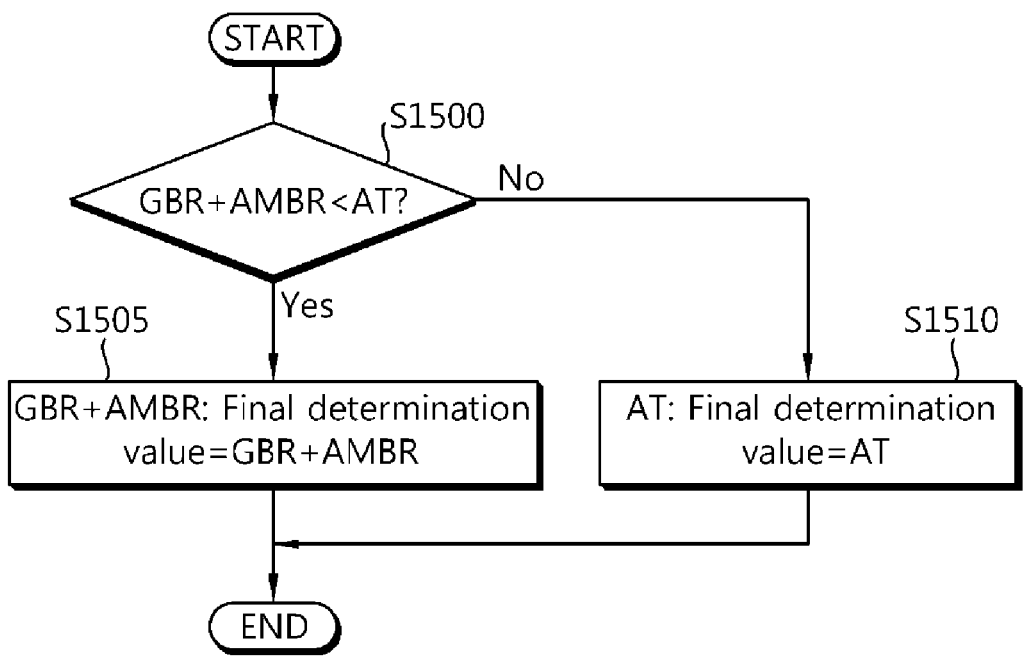
FIG. 15 is a flowchart illustrating a method of a target BS finding a final determination value according to an example of the present invention.

FIG. 15 is a flowchart illustrating a method of a target BS finding a final determination value according to an example of the present invention.

Referring to FIG. 15, the target BS compares the sum (GBR+AMBR) of a GBR and an AMBR, included in service state information of a UE, and an average throughput at step S1500. The target BS may determine a smaller value, from among the average throughput (AT) and the sum (GBR+AMBR) of the GBR and the AMBR, as a final determination value. In other words, even after the UE moves to the target BS, the throughput of a degree that satisfies QoS defined in a source BS has to be guaranteed. For example, an average throughput (AT) greater than the sum (GBR+AMBR) of the GBR and the AMBR must be guaranteed at step S1505. Alternatively, if the average throughput (AT) is equal to or smaller than the sum (GBR+AMBR) of the GBR and the AMBR when handover is performed, the target BS has to guarantee a bit rate of a degree corresponding to at least the average throughput (AT) at step S1510.

If the sum (GBR+AMBR) of the GBR and the AMBR is smaller than the average throughput (AT), the target BS determines the sum (GBR+AMBR) of the GBR and the AMBR as the final determination value at step S1505.

Accordingly, the target BS may select a candidate cell, supporting a level corresponding to at least the sum of the GBR and the AMBR, as a final cell. For example, when the sum (i.e., N) of the GBR and the AMBR of a candidate cell 1 is equal to or greater than a final determination value, the target BS may select the candidate cell 1 as a final cell.

If the sum of the GBR and the AMBR is equal to or greater than the average throughput (AT) at step S1500, the target BS determines the average throughput (AT) as the final determination value at step S1510. For example, if an average throughput M of a candidate cell 2 is equal to or greater than the final determination value, the target BS may select the candidate cell 2 as a final cell.

That is, the target BS may select a smaller value from among the average throughput (AT) and the sum (GBR+AMBR) of the GBR and the AMBR, included in the service state information of the UE, as a final determination value and selects a candidate cell, supporting a level equal to or greater than the smaller value, as a final cell.

Figure 16:
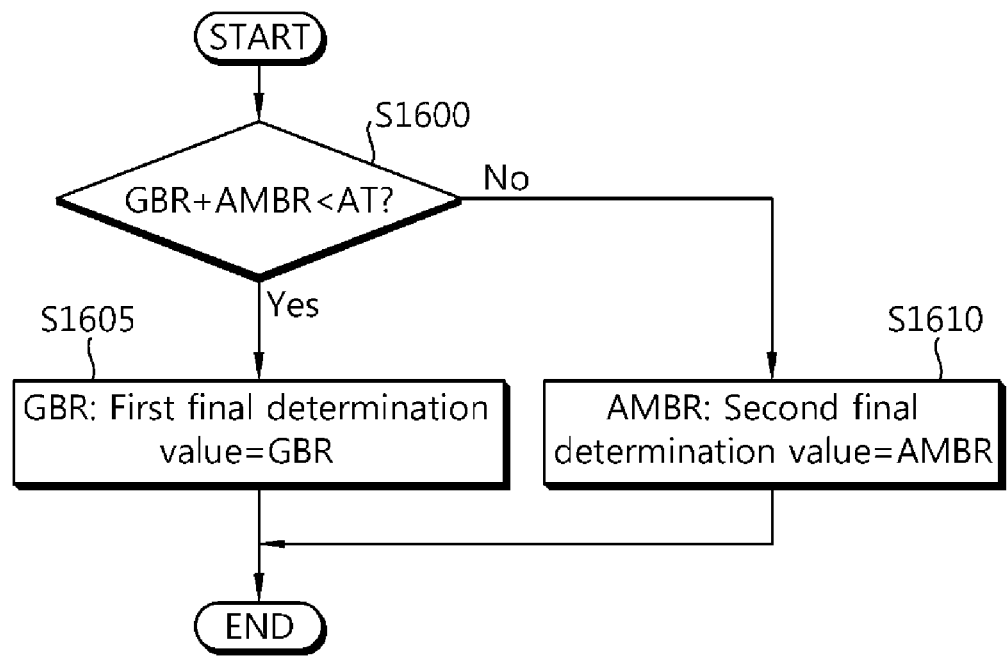
FIG. 16 is a flowchart illustrating a method of a target BS finding a final determination value according to another example of the present invention.

FIG. 16 is a flowchart illustrating a method of a target BS finding a final determination value according to another example of the present invention.

Referring to FIG. 16, the target BS compares the sum (GBR+AMBR) of a GBR and an AMBR, included in service state information of a UE, and an average throughput (AT) at step S1600. The target BS may determine a GBR that must be guaranteed at a minimum as one final determination value, calculate a bit rate that must be guaranteed at a minimum, and determine the calculated bit rate as the other final determination value. For example, a GBR has to be guaranteed in a specific serving cell (i.e., a primary serving cell or a specific secondary serving cell). Here, the bit rate that has to be provided other than the GBR may be provided by another serving cell (i.e., a primary serving cell or a specific one secondary serving cell or several secondary serving cells). That is, a final determination value may be determined for each cell.

Accordingly, if the sum of the GBR and the AMBR is smaller than the average throughput (AT), the target BS determines the GBR as a first final determination value and the AMBR as a second final determination value at step S1605. Since the sum of the GBR and the AMBR is smaller than the average throughput (AT), a bit rate greater than the AMBR may be requested even though a bit rate corresponding to the average throughput (AT) is not requested. For example, the target BS may use the first final determination value as a basis for selecting a primary serving cell and use the second final determination value as a basis for selecting a secondary serving cell.

If the sum of the GBR and the AMBR is equal to or greater than the average throughput (AT) at step S1600, the target BS determines the GBR as a first maximum determination value and determines a difference between the average throughput (AT) and a minimum GBR as a second maximum determination value at step S1610. It corresponds to a case where a difference between the average throughput (AT) and the AMBR is smaller than the GBR. Accordingly, although a level corresponding to the average throughput (AT) other than the GBR is not requested, a bit rate greater than the difference between the average throughput (AT) and the AMBR may be requested.

For example, the target BS may select a primary serving cell, supporting a bit rate corresponding to at least the first final determination value, as a final cell and select a secondary serving cell, supporting a bit rate corresponding to at least the second final determination value, as a final cell.

Figure 17:
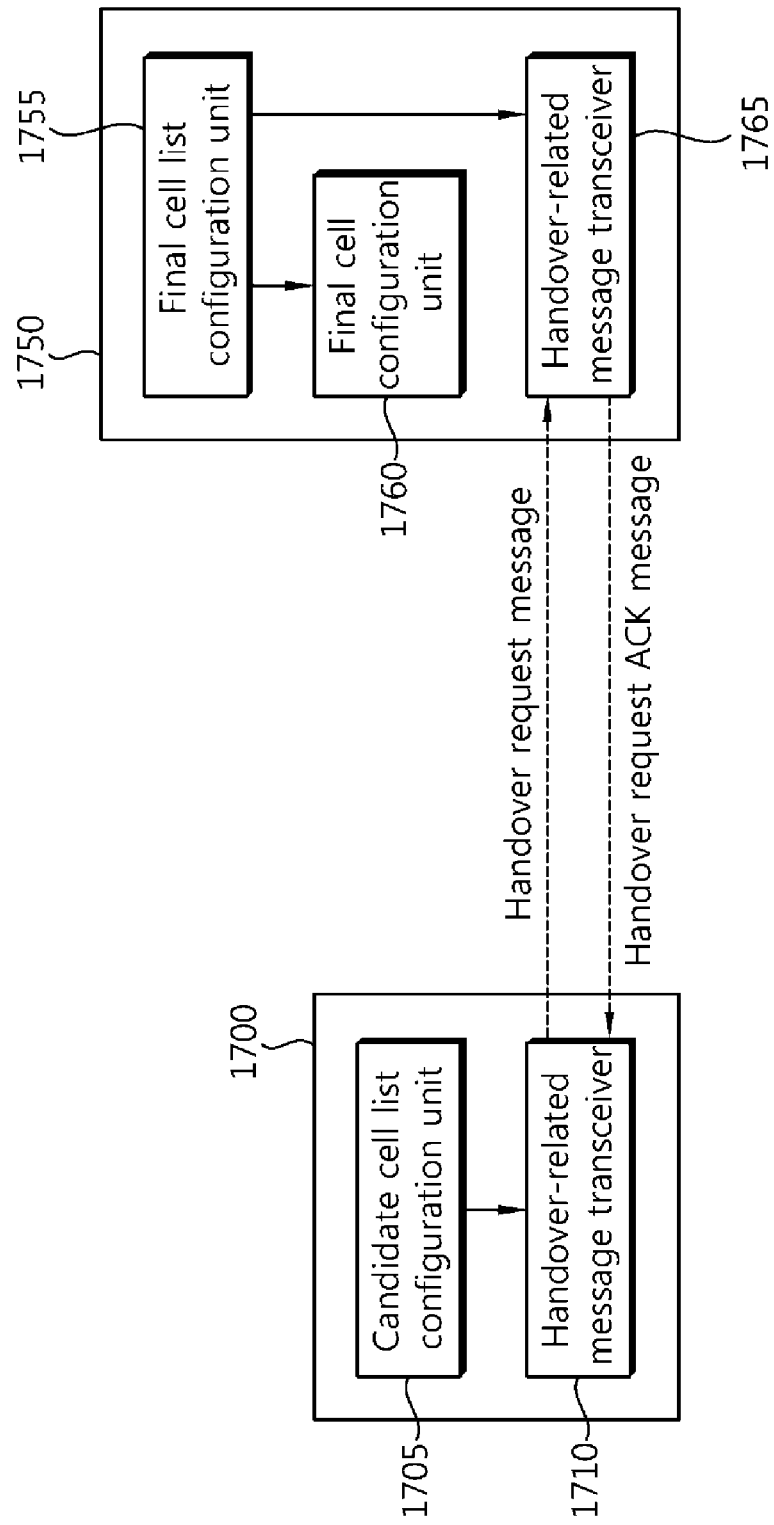
FIG. 17 is a block diagram showing a source BS and a target BS performing handover according to an example of the present invention.

FIG. 17 is a block diagram showing a source BS and a target BS performing handover according to an example of the present invention.

Referring to FIG. 17, the source BS 1700 includes a candidate cell list configuration unit 1705 and a handover-related message transceiver 1710.

The candidate cell list configuration unit 1705 configures a candidate cell list suitable for a UE. A method of configuring the candidate cell list is the same as that described at step S1205 of FIG. 12.

The handover-related message transceiver 1710 generates service state information including a candidate cell list and sends a handover request message, including the service state information, to a target BS 1750. The handover-related message transceiver 1710 receives a handover request ACK message transmitted by the target BS 1750 in response to the handover request message.

Furthermore, the handover-related message transceiver 1710 sends a handover command message to the UE. The handover command message includes information about a final cell which has been finally selected by the target BS and which can guarantee QoS of the UE to the highest degree. The handover-related message transceiver 1710 completes handover by sending the information about the final cell to the UE. Meanwhile, the target BS 1750 includes a final cell list configuration unit 1755, a handover-related message transceiver 1765, and a final cell configuration unit 1760.

The final cell list configuration unit 1755 configures a final cell list. A method of the final cell list configuration unit 1755 configuring the final cell list is the same as that described above with reference to FIGS. 14 to 16 and the step S1305 of FIG. 13. That is, the final cell list configuration unit 1755 selectively extracts at least one specific cell suitable for a relevant criterion from received candidate cells by taking a GBR, an AMBR including a maximum bit rate for guaranteeing the QoS of a UE other than the GBR, and an average throughput of packets for guaranteeing the QoS of the UE into account. The final cell list configuration unit 1755 configures the at least one extracted cell in the form of a final cell list. The final cell list may have at least one combination of a logical or physical index and a carrier frequency of the selected final cell.

The final cell configuration unit 1760 configures serving cells selected as the final cells. Here, a UE that has completed handover completes the reception of system information which is necessary to send and receive data to and from the selected cells.

The handover-related message transceiver 1765 receives a handover request message from the source BS 1700 and sends a handover request ACK message, including the final cell list, to the source BS 1700.

Figure 18:
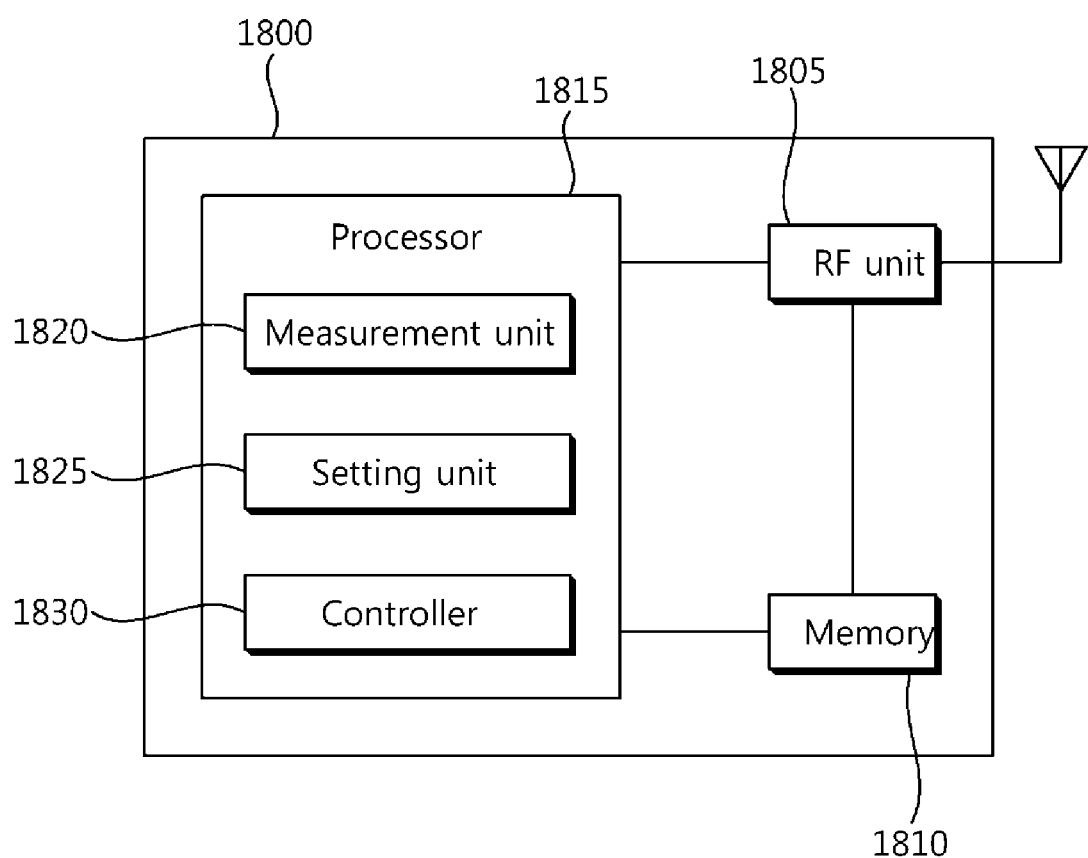
FIG. 18 is a block diagram of a UE performing handover according to an example of the present invention.

FIG. 18 is a block diagram of a UE performing handover according to an example of the present invention. Referring to FIG. 18, the UE 1800 includes a Radio Frequency (RF) unit 1805, memory 1810, and a processor 1815.

The UE 1800 may send and receive necessary information through the RF unit 1805. In a system to which the present invention is applied, the RF unit 1805 of the UE supports a multiple component carrier system as described above.

The memory 1810 stores information necessary for the UE 1800 to perform communication over a network. The memory 1810 may store measurement report configuration information received from a source BS and store measurement results based on the measurement report configuration information. Furthermore, the memory 1810 may store information (e.g., information about a Random Access Channel (RACH) configuration or a Physical Random Access Channel (PRACH) configuration necessary when handover is performed) received from a (source) BS and a final cell list written by a target BS.

The processor 1815 is connected to the RF unit 1805 and the memory 1810 and configured to control the RF unit 1805 and the memory 1810. The processor 1815 includes a measurement unit 1820, a configuration unit 1825, and a controller 1830.

The measurement unit 1820 performs measurement based on the measurement report configuration information received from the source BS. The measurement results are transferred to the source BS through the RF unit 1805. The source BS may configure the service state information based on the received measurement results. The service state information may include a candidate cell list selected based on a channel state for each cell when handover is performed. The target BS may receive the service state information from the source BS and may configure a final cell list including cells satisfying a specific criterion, from among cells included in the candidate cell list.

The configuration unit 1825 performs configuration processing pertinent to each operation performed by the UE 1800. For example, the configuration unit 1825 may use configuration necessary for the UE 1800 to perform the measurement based on the measurement report configuration information received from the source BS. Furthermore, the configuration unit 1825 may use RRC establishment in response to an RRC connection establishment message or an RRC connection reestablishment message received from the source BS in an RRC connection establishment or an RRC connection reestablishment procedure. The configuration unit 1825 performs operations regarding connection establishment in a handover procedure and use RACH and PRACH configurations based on system information for a random access operation to be performed in the handover procedure.

The configuration unit 1825 may perform an operation for establishing connection to a target handover cell included in a handover command message received from the source BS. The target handover cell may be designated by the source BS on the final cell list written by the target BS. In this case, the configuration unit 1825 uses configuration so that handover to a cell designated by the source BS is performed.

Alternatively, the target handover cell may be selected by the configuration unit 1825 on the final cell list. For example, the configuration unit 1825 may randomly select the target handover cell on the final cell list. Furthermore, the configuration unit 1825 may select the target handover cell on the final cell list as the same cell as a primary serving cell in the source BS and use configuration so that handover to the selected cell is performed. Furthermore, the configuration unit 1825 may select any one of the serving cell of the source BS and the primary serving cell and the secondary serving cell of the source BS, from among the cells of the final cell list, and use configuration so that handover to the selected cell is performed.

In the above cases, a target BS configures a final cell list using available cells to which handover can be performed. When information about a cell to which configuration has been applied in order to perform handover, from among cells included in the final cell list, is received from a UE, the target BS can perform an operation for performing handover to the relevant cell. The information about a cell to which configuration has been applied in order to perform handover may be included in a handover confirmation message and transferred from the UE to the target BS.

The controller 1830 is connected to the measurement unit 1820 and the configuration unit 1825 and is configured to control the measurement unit 1820 and the configuration unit 1825 and to implement the operations and functions of a UE described in this specification. The controller 1820 performs operations, such as measurement, RRC connection establishment, and handover according to configuration used by the configuration unit 1825. For example, the controller 1820 may send information about a cell to which configuration has been applied in order to perform handover to the target BS through the RF unit 1805.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of a target Base Station (BS) performing handover in a multiple component carrier system, the method comprising:
   receiving service state information, including information about at least one candidate cell, from a source BS through a handover request message;
   calculating a final determination value for determining a final cell for a User Equipment (UE) which is a subject of the handover based on the service state information;
   selecting the final cell by comparing the final determination value and the information about the candidate cell; and
   sending a handover request Acknowledgment (ACK) message, including information about the selected final cell, to the source BS,
   wherein the service state information comprises at least one of a Guaranteed Bit Rate (GBR) which is a minimum bit rate for guaranteeing Quality of Service (QoS) of the UE, an Aggregated Maximum Bit Rate (AMBR) which is a maximum bit rate for guaranteeing the QoS of the UE in relation to bearers other than a bearer to which the GBR is applied, and an Average Throughput (AT) of packets for guaranteeing the QoS of the UE.

2. The method of claim 1, wherein:
   the service state information comprises a measurement report configured by the UE which is the subject of the handover, and
   the information about the at least one candidate cell is included in the service state information in a form of the measurement report.

3. The method of claim 1, wherein calculating the final determination value comprises determining values, determined based on the GBR and the AMBR, as the final determination value.

4. The method of claim 3, wherein selecting the final cell comprises selecting the candidate cell, having a bit rate existing within the GBR and a range of a sum of the GBR and the AMBR, as the final cell.

5. The method of claim 4, wherein selecting the final cell comprises selecting a plurality of the candidate cells as the final cells, when a sum of throughputs of the plurality of candidate cells falls within a range between the final determination values determined based on the GBR and the AMBR.

6. The method of claim 1, wherein calculating the final determination value comprises determining the Average Throughput (AT), included in the service state information, as the final determination value.

7. The method of claim 6, wherein the candidate cell having a throughput existing within a range determined by the AT is selected as the final cell.

8. The method of claim 7, wherein when a sum of throughputs of the plurality of candidate cells exists within the range determined by the AT, the plurality of candidate cells are selected as the final cells.

9. The method of claim 1, further comprising sending, to the source BS, the handover request ACK message comprising a final cell list, including at least one combination of a logical index of the selected final cell, a physical index of the selected final cell, and a frequency of the selected final cell.

10. A target Base Station (BS) performing handover in a multiple component carrier system, the target BS comprising:
 a transceiver for sending and receiving information about the handover to and from a source BS; and
 a processor configured to perform processes comprising:
  a list configuration process to select a serving cell to be applied to a User Equipment (UE) which will handover and configuring a list regarding the selected serving cell; and
  a cell configuration process to configure the selected serving cell,
 wherein the transceiver receives service state information about a state of service, provided to the UE, from the source BS of the UE, and
 the list configuration process selects the serving cell for the UE based on the received service state information,
 wherein:
 the list configuration process selects the serving cell for the UE from one or more handover candidate cells based on information about the candidate cell or information about the service provided to the UE or both,
 the service state information comprises the information about the one or more handover candidate cells, the information about the candidate cell and/or the information about the service provided to the UE,
 the information about the service provided to the UE comprises at least one of a Guaranteed Bit Rate (GBR) which is a minimum bit rate for guaranteeing the service provided to the UE, an Aggregated Maximum Bit Rate (AMBR) which is a maximum bit rate for guaranteeing QoS of the UE in relation to bearers other than a bearer to which the GBR is applied, and information about candidate cells with an Average Throughput (AT) of packets for guaranteeing the QoS of the UE, and
 the information about the candidate cell comprises a measurement value measured by the UE.

11. The target BS of claim 10, wherein the list configuration process selects the candidate cell, having a bit rate corresponding to a range between the GBR and a sum of the GBR and the AMBR, as the serving cell.

12. The target BS of claim 10, wherein the list configuration process selects the candidate cell, having a throughput higher than the AT, as the serving cell.

13. A method of a source Base Station (BS) performing handover in a multiple component carrier system, the method comprising:
 receiving a measurement report from a User Equipment (UE);
 configuring a candidate cell list for handover of the UE based on the measurement report;
 sending a handover request message for the UE to a target BS;
 receiving a handover request ACK message for the UE from a target BS;
 determining the handover of the UE; and
 sending a handover command message to the UE,
 wherein the candidate cell list comprises information about at least one candidate cell, and
 the candidate cell list is included in the handover request message along with information about service provided to the UE and transmitted to the target BS,
 wherein the information about the service provided to the UE comprises at least one of a Guaranteed Bit Rate (GBR) which is a minimum bit rate for guaranteeing the service provided to the UE, an Aggregated Maximum Bit Rate (AMBR) which is a maximum bit rate for guaranteeing Quality of Service (QoS) of the UE in relation to bearers other than a bearer to which the GBR is applied, and information about candidate cells with an Average Throughput (AT) of packets for guaranteeing the QoS of the UE.

14. A source Base Station (BS) performing handover in a multiple component carrier system, comprising:
 a transceiver for receiving a measurement report from a User Equipment (UE) and sending and receiving handover information about the UE; and
 a processor configured to perform a list configuration process to select a handover candidate cell for the UE based on the measurement report of the UE and configure a list including the selected handover candidate cell,
 wherein the transceiver sends the list of the handover candidate cell, together with service information about the UE, to a target BS related to handover of the UE,
 wherein the service information about the UE comprises at least one of a Guaranteed Bit Rate (GBR) which is a minimum bit rate for guaranteeing the service provided to the UE, an Aggregated Maximum Bit Rate (AMBR) which is a maximum bit rate for guaranteeing Quality of Service (QoS) of the UE in relation to bearers other than a bearer to which the GBR is applied, and information about candidate cells with an Average Throughput (AT) of packets for guaranteeing the QoS of the UE.

* * * * *